Nov. 15, 1960  J. C. F. C. RICHTER  2,960,161
DEVICE FOR DISCHARGING MATERIALS FROM VESSELS
Filed May 15, 1958  2 Sheets-Sheet 1
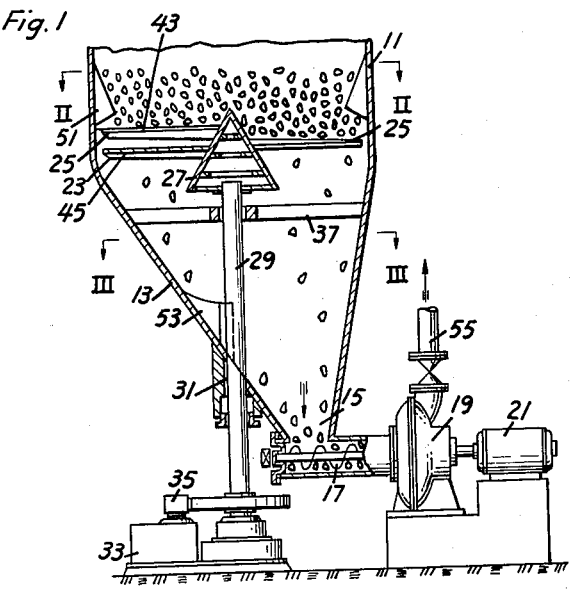
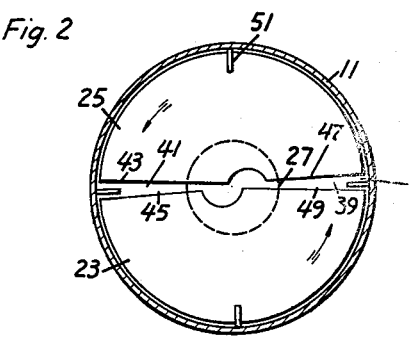
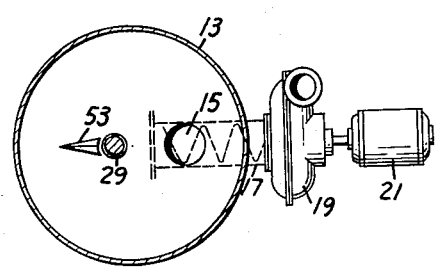
INVENTOR
JOHAN C.F.C. RICHTER Nov. 15, 1960   J. C. F. C. RICHTER   2,960,161
DEVICE FOR DISCHARGING MATERIALS FROM VESSELS
Filed May 15, 1958   2 Sheets-Sheet 2
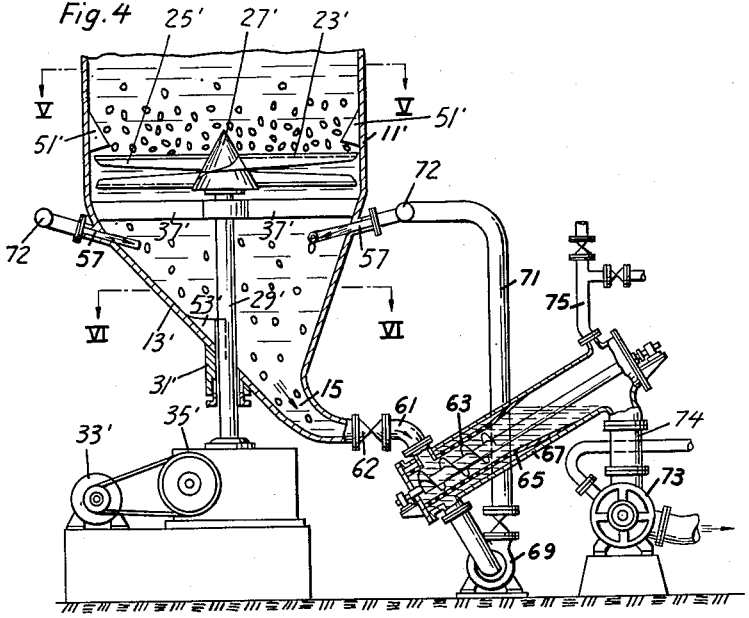
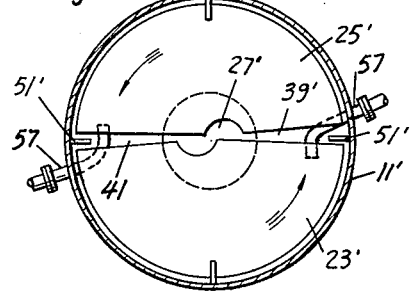
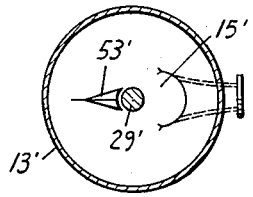
INVENTOR
JOHAN C. F. C. RICHTER
BY Cushman, Darby & Cushman
ATTORNEYS

2,960,161
DEVICE FOR DISCHARGING MATERIALS FROM VESSELS

John C. F. C. Richter, 67 Alvgatan, Karlstad, Sweden

Filed May 15, 1958, Ser. No. 735,407

Claims priority, application Sweden May 16, 1957

10 Claims. (Cl. 162—246)

This invention relates to devices for discharging fibrous or like material from a pressure vessel. It has particular application to the discharge of finely comminuted fibrous material such as wood chips, cut wood, bamboo, concentrated suspensions of digested cellulose pulp and the like from an upright or substantially upright pressure vessel, such as a reaction tower, a steaming vessel, a pre-hydrolysis treatment vessel, a digester for chemical or semichemical pulp, a bleaching tank and the like.

Due to the high pressures prevailing in such vessels as those referred to, the fibrous material has a tendency to compact itself at the outlet and clog the same. The problems presented thereby are aggravated by a pressure drop usually taking place in the outlet proper. Another problem resides in that the material tends to flow faster through the vessel at certain regions, usually the transverse center regions, whereas along the walls of the vessel the material moves more slowly in its passage through the vessel.

The principal object of the invention is to eliminate these and other problems by providing a pressure vessel, of the type referred to, with a novel means for facilitating satisfactory and desirable discharge of the material therefrom.

Further objects reside in the provision of novel structures, and arrangements thereof in connection with pressure vessels, of the type referred to, for effecting a steady and uniform flow of material to the outlet of the vessel and for conveying the material away from said outlet.

According to my invention, it is contemplated that an outlet be formed at or near the bottom of the pressure vessel and that above the outlet there is arranged an essentially horizontal bottom plate means rotatable about a vertical axis, said plate means being shaped as a helical surface in order to be operable, during rotation, to gradually transfer to the space below the bottom plate means the lowermost layer of the fibrous material column resting upon the upper face of the bottom plate means, so that the column drops uniformly over the entire transverse sectional area of the vessel. It is further contemplated that the material column be supported by the rotatable plate means, that the weight of the column of material in the vessel will not in any way affect the conditions at the outlet proper, and that the material gradually separated from the column by the plate means pass through the outlet in a loose form or as a fluent suspension.

Further objects and advantages of the invention will be in part obvious and in part pointed out hereinafter.

The novel features of the invention may be best made clear from the following description and accompanying drawings in which:

Figure 1 is a fragmentary vertical sectional view of a pressure vessel equipped with one embodiment of my invention;

Figures 2 and 3 are horizontal sectional views taken respectively on lines II—II and III—III of Figure 1;

Figure 4 is a view corresponding to Figure 1 and showing another embodiment of my invention;

Figures 5 and 6 are horizontal sectional views taken respectively along lines V—V and VI—VI of Figure 4.

Referring to the illustrative embodiment shown in Figure 1, 11 designates the lower end of a standing cylindrical pressure vessel, the upper end of which (not shown) is continuously charged in any suitable manner with chips, for example, which chips may be moistened with any suitable treating liquid or merely with water, as is known. The vessel 11 is closed and through a conduit (not shown) steam is supplied, whereby the chips are heated to a temperature which, depending upon the treatment involved, may lie somewhere between 110 and 200 degrees centigrade. Due to this steam filling operation, the vessel is maintained under a corresponding overpressure; i.e., a pressure above atmospheric, and for example, of the order of 8 atmospheres gauge.

At its lower end the cylindrical part of the vessel 11 merges into a downwardly and inwardly tapering, funnel shaped portion 13 terminating in an eccentrically located outlet 15. Disposed at the outlet 15 may be a horizontal screw conveyor 17 and a conventional defibrator or defibering device 19, both of which may be driven by suitable connection to a motor 21.

Mounted in vessel 11, preferably substantially at the level where the cylindrical portion and the inverted generally conical portion of the vessel join, is a rotatable horizontal bottom plate means. This means supports the column of material in the vessel so that the funnel-shaped portion is relieved of the weight of the column of material. As best seen in Figures 1 and 2, two helical flights 23, 25 define the plate means. As shown, these flights are attached to a centrally disposed and upright conical member 27. Member 27 is shown fixedly mounted on the upper end of a centrally located vertical driving shaft 29, journalled in portion 13 and extending through a stuffing box 31 or the like carried by the wall of the portion 13.

A motor 33 and conventional speed reducing gear arrangement 35 may be operatively connected to shaft 29, as shown, to rotate the latter at a relatively low speed, for instance ¼ to 2 revolutions per minute, and in the direction indicated by arrows in Figure 2. 37 designates radially extending braces for the shaft 29, suitably arranged within the vessel, for example, adjacent to and below the member 27, as shown.

The helical flights 23 and 25 preferably are of the relatively flat configuration shown, extending throughout an angle of approximately 180°. These flights, as indicated, preferably are arranged substantially at the same elevation, with the radial leading edge 43 of flight 25 being substantially at the same level on member 27 as the radial leading edge 49 of flight 23 and approximately 180° out of phase therewith, as best seen in Figure 2. The radial trailing edges 45, 47 of flights 23, 25 respectively likewise preferably are disposed at substantially the same level on member 27 and approximately 180° out of phase with each other.

The leading edges of the flights are spaced above the trailing edges to define radially extending passageways 39, 41 therebetween, as shown in Figure 2. In this embodiment, the leading edges 43, 49 are also slightly spaced laterally from the adjacent trailing edges 45, 47 respectively whereby the radial passages 39, 41 also define narrow vertically extending openings or passages.

As shown, the flights 23, 25 extend radially outwardly from member 27 to the immediate vicinity of the adjacent cylindrical wall of the vessel 11 to prevent the material from discharging through the space between the flights and the adjacent vessel wall. Hence, the only passage for the material will be the openings 39, 41.

The vertical gaps or spaces formed between the edges 43 and 45, and also between the edges 47, 49, as is evident, will be of a height corresponding to the pitch of one-half of the circumference of the helical surface of the two flights 23, 25. If the diameter of the vessel 11 and the combined flights 23, 25 is of the order of 2,000 to 3,000 mm., the height of these gaps may be approximately 150 to 300 mm.

When the shaft 29 is rotated to rotate the flights in the direction of the arrows in Figure 2, the leading edges 43, 49 will function similarly to the cutting edges of an auger or similar tool, and will separate off a layer of material from the lower end of the material column, such layer having a thickness corresponding to the height of the aforesaid gaps between the upper leading edges 43, 49 and the lower trailing edges 45, 47. The chips of such layer will be transferred through the openings 39, 41 to the space below the flights, as will be understood.

The height of the aforesaid gap enables comparatively coarse chips as well as knots and splinters therein to pass through such openings 39, 41 without tending to clog or form plugs. By virtue of the adhesive and/or cohesive forces between the chips, bridges are formed over the openings 39, 41 when the flights are stationary so that chips are fed therethrough only when the flights are rotated. When the material is more finely comminuted, the flights may be designed to extend over an angle greater than 180°, so that they partially overlap each other; in other words, so that the leading edges 43, 49 would overlap the adjacent trailing edges 45, 47 respectively. Then the passages between the adjacent leading and trailing edges will be directed parallel to the helical surfaces of the blades, i.e., essentially horizontal.

Attached to the inside of the vessel wall immediately above the bottom plate is a plurality of radially arranged fins 51 for the purpose of preventing the column of chips from rotating together with the flights 23, 25. Thus when the flights are rotated, the column of chips will move only in vertically downward direction, and continuously and uniformly. Only adjacent the member 27 may a slight lateral displacement take place, otherwise there is no rearrangement or internal movement in the column of chips which could give rise to disturbances of or irregularities in the even and uniform descent of the chips column.

After the chips have passed through the flights 23, 25, they drop through the steam-filled funnel 13, which is practically empty of chips. In order to prevent chips from jamming between the wall of the funnel 13 and the shaft 29, an upwardly tapering fin 53 may be arranged in the space therebetween, as shown. At the outlet 15 the chips enter the thread of the screw conveyor 17 and are carried by the same to the device 19, from which the chips are delivered through the conduit 55 and at a reduced pressure. The screw of the conveyor 17 preferably is driven at such a high speed that chips will not collect in the outlet 15, therefore eliminating the possibility of having the outlet clogged by plugs or bridges of chips.

The embodiment shown in Figures 4–6 differs from that of Figures 1–3 essentially only with respect to the manner of discharging the chips from the funnel-shaped space below the rotating flights. Similar reference characters have been used to designate similar parts in the two embodiments. The discharge in the Figure 4 embodiment is assisted by means of a circulating liquid supplied through a number of nozzles 57 arranged below the flights 23', 25' in the portion 13', and preferably being tangentially directed to circulate liquid in a direction opposite to the direction of rotation of the flights.

The chips dropping through the flights are whirled up in the liquid introduced through nozzles 57 and form a suspension which readily flows through the outlet 15' of the funnel portion 13'. A conduit 61 is connected at one end to a valve 62 connected to the outlet 15'. The other end of conduit 61 is connected to a screw conveyor 63, the shaft of which is inclined upwardly, as shown. The screw of the conveyor preferably is enclosed by an inner, perforated or sieve-like housing 65, said housing being in turn enclosed by an outer housing 67.

The liquid drained from the chips through housing 65 collects in the space between housings 65 and 67, and is returned by a pump 69 through the conduit 71 to the flushing nozzles 57. An annular pipe 72 may be provided to connect conduit 71 with the nozzles 57, the pipe 72 encircling vessel 11', as indicated.

A conduit 74 leads from the upper discharge end of conveyor 63 to a valve 73 through which the chips are transferred to a higher or lower pressure for further treatment, or the chips may be transferred to atmospheric pressure. Valve 73 is of the type designed to permit material to flow therethrough without letting the pressure in conduit 74 be influenced or changed by the pressure at the downstream or outlet side of the valve. Hence, the pressure in the vessel 11' will be maintained. One such valve device is shown in my copending application, Serial No. 590,218, now Patent No. 2,870,009, and is of the rotary type including a plurality of rotating pockets or cells defined by radial walls.

Since some liquid may be discharged through conduit 74 with the chips, a line 75 may be provided opening into housing 67, as shown, and communicating with a source of liquid (not shown) to permit introduction of additional liquid into the housing, as desired.

Thus, it will be possible to insure that a sufficient quantity of liquid for flushing through nozzles 57 will be provided in the housing 67. The quantity of circulating liquid will depend on the size of the chips and the shape of the bottom of the vessel. As an example, this quantity may be between 10 and 80 liters per kilogram of the chips flushed out of the vessel 11'.

This procedure of discharging the material from the vessel by utilizing circulating liquid may also be used in the situation where the chips in the vessel are mixed with a treating liquid and the column of chips is completely or partially submerged below the level of such treating liquid. If the vessel is completely filled with treating liquid, the chips must be sufficiently impregnated by the liquid so that they do not float but rest upon the rotating helical flights with at least part of their weight.

As is evident, discharging devices according to the invention may also be used in pressure vessels in which cellulosic pulp of a high consistency, for instance a dry content of 15 percent or higher, has been subjected to some treatment, for example, bleaching. It will further be evident that still other materials may be satisfactorily discharged in accordance with the teachings of this invention.

If desired, the plate means at the bottom of the vessel may be composed of three, four or more helical flights in lieu of the two shown, or it may be designed as a single screw thread extending through approximately 360°. The stationary bottom of the vessel may be formed as an annular groove and an impeller or similar means may be arranged therein in order to cause a heavy flow of circulating liquid, whereby the fibrous material is held in suspension so that it is easily flushed out through the outlet.

The present invention will thus be seen to completely and effectively accomplish the objects enumerated hereinabove. It will be realized, however, that various changes and substitutions may be made to the specific embodiments disclosed herein for the purpose of illustrating the principles of this invention, without departing from these principles. Therefore, this invention includes all modifications encompassed within the spirit and scope of the following claims.

I claim:

1. In a device of the character described, an upstanding vessel for containing a column of fibrous material or the like, an outlet at the bottom of said vessel, means for feeding such material to said outlet, said means including a substantially horizontally disposed plate means arranged above said outlet for rotation about a vertical axis, said plate means being defined by a helical surface on which the material is adapted to rest and which is operable during rotation thereof to gradually transfer material from the column toward said outlet, and said plate means includes two helical flights arranged at substantially the same level, said flights extending throughout substantially the entire transverse sectional area defined by the adjacent portion of said vessel with through radial passages being formed between said flights for the flow of material therethrough.

2. The structure defined in claim 1 wherein said helical flights each extend through approximately 180°, the corresponding leading and trailing edges of the flights being spaced approximately 180° out of phase relative to each other, and the radial passages being defined by a lateral spacing between the leading and trailing edges of said flights.

3. The structure defined in claim 2 wherein a centrally located vertical shaft is journalled in said vessel below said flights, an upstanding conically-shaped member being fixed to the top of said shaft, and said flights being mounted on said member.

4. The structure defined in claim 3 wherein that portion of the vessel below said flights tapers downwardly and inwardly terminating in said outlet, and said outlet being eccentrically disposed relative to said shaft.

5. The structure defined in claim 4 wherein conveyor means are provided in operative connection with said outlet for conveying the material therefrom.

6. The structure defined in claim 5 wherein said conveyor means is a screw conveyor having an inclined axis of rotation, and a perforated housing enclosing said screw conveyor for the passage of liquid radially from the material being axially conveyed through the housing.

7. The structure defined in claim 6 wherein nozzle means are provided opening tangentially into the downwardly and inwardly tapering portion of said vessel, and means communicating with said nozzle means and said perforated housing for delivering to said nozzle means the liquid passing through said perforated housing.

8. The structure defined in claim 7 wherein said nozzle means are disposed to induce an angular flow of liquid below said flights and circulating in a direction opposite to the direction of rotation of said flights.

9. In a device of the character described, an upstanding vessel for containing a column of fibrous material, an outlet for fibrous material at the bottom of said vessel, a substantially horizontally disposed plate means arranged in said vessel above said outlet and extending essentially over the whole cross-sectional area of said vessel so as to support said column, a rotary vertical shaft extending through the bottom of said vessel and attached to said plate means for carrying and rotating the same, the portion of the vessel below said plate means being tapered downwardly and inwardly towards said outlet, said plate means having apertures for gradually transferring the fibrous material from the lower end of said column into said tapering portion of the vessel when said plate means rotates, nozzle means opening into said tapering portion of the vessel, and means for supplying liquid to said nozzle means for diluting the fibrous material transferred through said apertures and flushing out the same through said outlet.

10. In a device of the character described, an upstanding vessel for containing a column of fibrous material or the like, an outlet at the bottom of said vessel, means for feeding such material to said outlet, said means including a substantially horizontally disposed plate means arranged above said outlet for rotation about a vertical axis, said plate means being defined by a helical surface on which the material is adapted to rest and which is operable during rotation thereof to gradually transfer material from the column toward said outlet, said helical surface being bordered by a peripheral edge extending along and in closely spaced relation of the vessel, and substantially radial edges extending from the center of said plate means to ends of said peripheral edge, said radial edges being mutually offset in the vertical direction so as to form between them a radial passage for the flow of material through said plate means.

References Cited in the file of this patent

UNITED STATES PATENTS

| | | |
|---|---|---|
| 914,349 | Hutchinson | Mar. 2, 1909 |
| 1,851,044 | Genovesi | Mar. 29, 1932 |
| 2,534,324 | Von Hildebrandt | Dec. 19, 1950 |
| 2,803,540 | Durant et al. | Aug. 20, 1957 |